Figure 1:
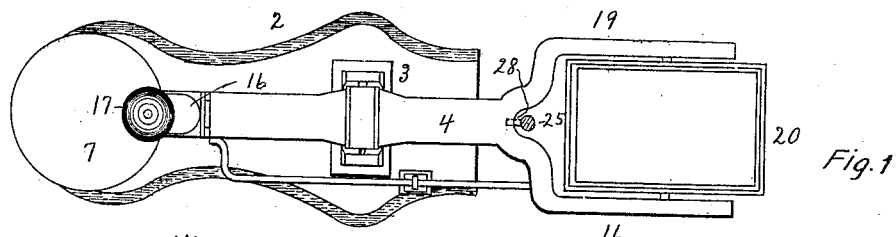

C. D. SCOTT.
AUTOMATIC WEIGHING APPARATUS.
APPLICATION FILED JULY 20, 1908.

921,170.

Patented May 11, 1909.
3 SHEETS—SHEET 1.

Witnesses
John A Hulett
J. O. Dill

Inventor
Charles D Scott
By J A Rauer
Atty

THE NORRIS PETERS CO., WASHINGTON, D. C.

C. D. SCOTT.
AUTOMATIC WEIGHING APPARATUS.
APPLICATION FILED JULY 20, 1908.

921,170.

Patented May 11, 1909.
3 SHEETS—SHEET 2.

Witnesses
John A Shult
J. O. Dill

Inventor
Charles D. Scott
By J. A. Rauer Atty

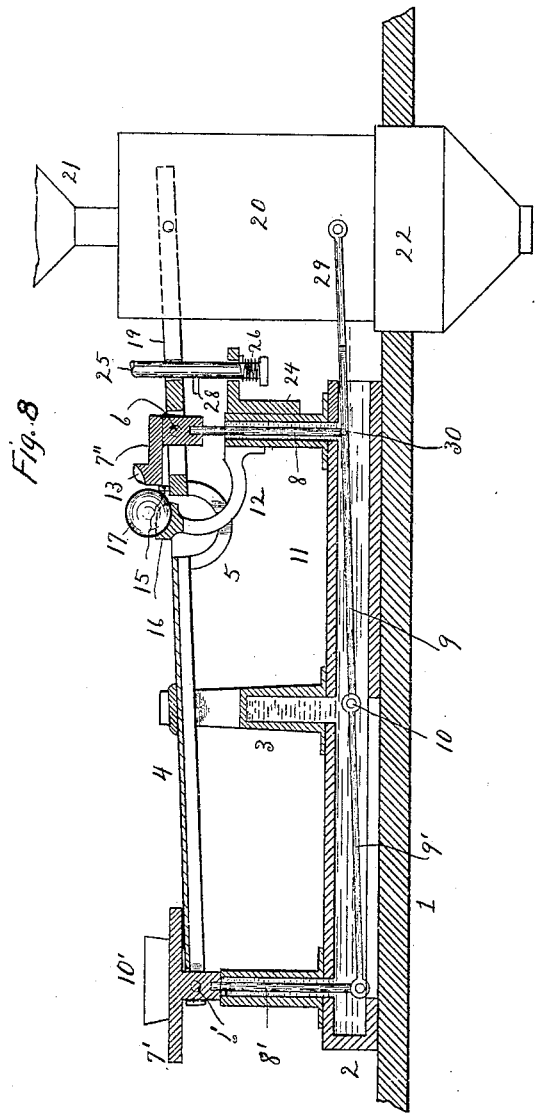

UNITED STATES PATENT OFFICE.

CHARLES D. SCOTT, OF TOPEKA, KANSAS.

AUTOMATIC WEIGHING APPARATUS.

No. 921,170.      Specification of Letters Patent.      Patented May 11, 1909.

Application filed July 20, 1908. Serial No. 444,363.

*To all whom it may concern:*

Be it known that I, CHARLES D. SCOTT, a citizen of the United States, residing in Topeka, in the county of Shawnee and State of Kansas, have invented a new and useful Improvement in Automatic Weighing Apparatus, of which the following is a specification.

My invention relates to the tripping devices in automatic weighing machines in which all or part of the motive power for operating the mechanism is furnished by the weight of the commodity which is being weighed.

It further relates to a weight-shifting element for automatically shifting a weight into and out of opposition to the commodity, or into or out of coöperation therewith.

It further consists of the parts, improvements, and combinations herein set forth and claimed.

In the drawings accompanying and forming part of this specification, and in the description of the drawings, I have shown my invention in its preferred form and have shown the best mode of applying the principles thereof. But it is to be understood that the invention itself is not confined to the exact details of these drawings and of that description, that it may be applied to other uses, that parts and combinations herein separately claimed may be used with or without other connecting parts or parts of similar general nature to those herein shown, and that I contemplate changes in form, proportions, materials, and arrangement, the transposition of parts, and the substitution of equivalent members without departing from the spirit of the invention.

Figure 4:
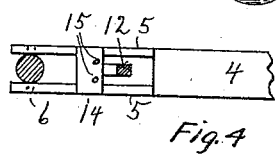
Figure 2:
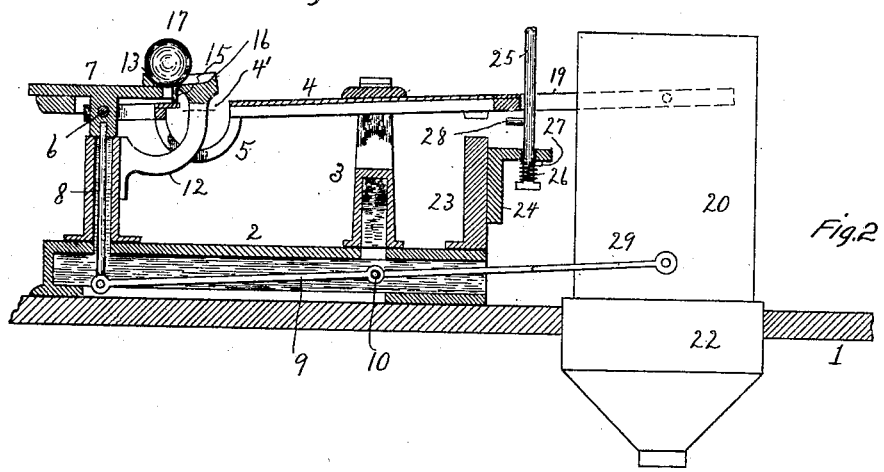
Figure 3:
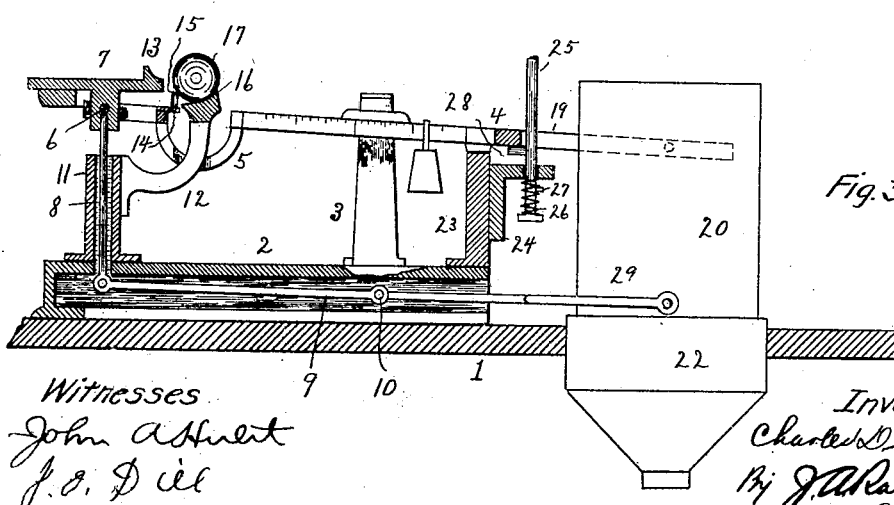
Figure 5:
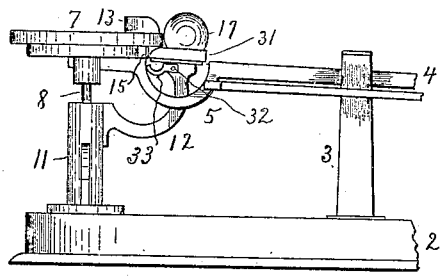
Figure 6:
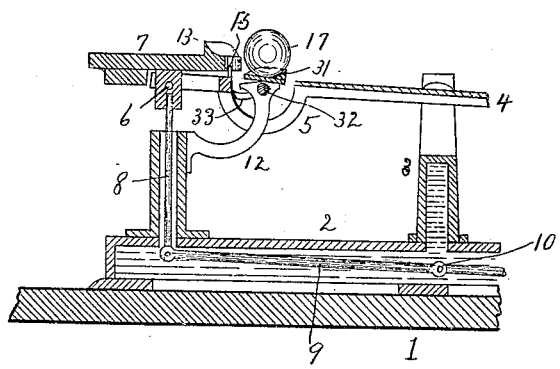
Figure 7:
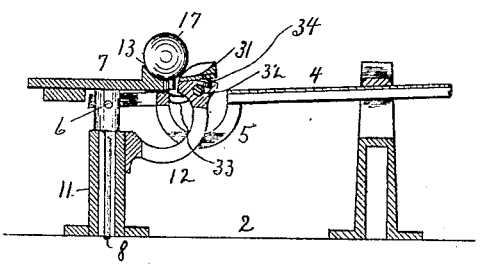

Figure 1 is a plan view of an automatic weighing apparatus made in accordance with the principles of my invention. In this view, as well as in others following I have merely shown one end of a tripping rod whereby the other working parts of the automatic weighing machine may be controlled; which other parts I have not shown in detail, my present invention being confined to the weight, or ball, and the weight or ball shifting apparatus. Fig. 2 is a vertical center sectional view of the apparatus, certain of the parts along the center line being shown in elevation. Fig. 3 is a similar view, showing the parts in their secondary positions, Figs. 1 and 2 showing them in their first positions. Fig. 4 is a plan view of the end of the scale-beam, with sectional views of the bracket and platform support. Fig. 5 is a side elevation of a modified form of my invention; and Fig. 6 is a vertical center sectional view thereof; the parts being shown in first position. Fig. 7 is a sectional view, the parts being in their secondary position. Fig. 8 is a further modification, in which the weight, instead of being shifted from the scale-beam to the frame to relieve the commodity of its counter-weight, is shifted from the frame to the opposite end of the scale-beam to increase the weight of the commodity end of the scale-beam.

Similar reference characters indicate like or corresponding parts throughout the several views.

1 represents the top of a table or other suitable support. 2 is the base of the machine, and 3 is the standard on which the balance-beam 4 is fulcrumed. The end of the balance-beam is forked, as at 5, 5, and pivoted thereon is the platform 7, 6 representing the pivotal point. Extending down from the platform is a stem or rod 8, pivoted to a rod 9, pivoted to the frame at 10, directly under the fulcrum of the balance-beam; which serve always to keep the table level.

11 is a hollow standard erected on the base, and 12 is a bracket extending therefrom through the curved forks 5, 5, and, in Figs. 1, 2, 3, 4, and 8, provided with a socket or groove 16 slanting downwardly and toward the platform 7.

13 is a similar socket or groove in the platform opposite the socket 16.

15, 15 are two pins set up from a crosspiece 14 on the two forks of the scale-beam, and located between the two sockets.

17 is a ball of metal or other heavy material.

The parts 13, 15, and 16 are so related that when the arm of the scale-beam is down, as in Figs. 1 and 2, the ball will roll from 16 onto 13 and 15, and be supported solely on 13 and 15, with its center of gravity between the two. The pivotal point 6 being farther from the fulcrum of the scale-beam than are the pins 15, it will be apparent that as the scale-beam travels upwardly toward the position shown in Fig. 3, the pins 15 will travel more slowly than the socket 13, thereby permitting the ball to roll from 13 and 15 onto the socket 16. And on return of the scale-beam to initial position (Fig. 2), the ball will roll back onto 13 and 15. The purpose of this action is, that when the desired weight has been taken into the weighing container, there will be a sudden shift of the weight of the ball from the balance-beam, thereby relatively increasing the weight of the container arm, and thereby permitting the weight of the commodity on the container arm suddenly to operate whatever mechanism it may be desired to operate thereby. By reason of the differential travel of the supports for the ball, it will be noted that the ball acts by reason of the force of gravity, and that there is no friction at the balancing point.

In Figs. 1, 2, and 3, I have shown the balance-beam extended in the form of a yoke 19 supporting a container 20, which may be adapted to empty its contents into a funnel 22. 23 is a standard to which is secured a bracket 24, in which works a rod 25, held in normal upper position by an extension spring 26, and limited in upward movement by a pin 27. 28 is a pin in the path of the balance-beam, whereby when that arm of the balance-beam is lowered, the rod 25 will be depressed against the tension of the spring, and when the arm is again raised, the spring will return the rod. 29 is another rod and yoke pivoted at 10, for evening the container. These parts represent somewhat graphically any kind of a container and tripping mechanism, rod 25 representing any suitable tripping rod for controlling the apparatus through the weight of the commodity in the container.

In Fig. 8 the platform 7' is slightly modified in form, and the yoke 19 is an extension of the same arm of the balance beam, while the yoke 29 is an extension of the rod 9, the stem 8 being pivoted thereto at 30. Also bracket 24 is secured to standard 11. At the other end of the balance-beam is pivoted the platform 7', at 6', provided with stem 8' and evener rod 9'. 10' represents an ordinary weight on the platform. In the device shown in Fig. 8, it will be noted that upon the desired amount of the commodity passing into the container, the weight will be suddenly shifted from the frame onto the container arm, thereby relatively increasing the weight of that arm. In both instances, however, the function of the mechanism is the same, namely, to increase suddenly the relative weight of the commodity arm, so that the friction of the working parts may be overcome by the weight of the commodity as distinguished from being overcome by the delicate balancing devices.

In Figs. 5, 6, and 7, a still further modification is shown. In this form, there is a tray 31 pivoted at 32 on the standard 12, and provided with two arms 33, and a spring 34. When the arm of the scale-beam is up (Figs. 5 and 6), the ball rolls onto 31, its weight tilting the tray back onto the spring 34. As the arm comes down, the arms 33 are depressed by the under side of the table 7, thereby throwing the ball over onto 13 and 15. The action in weighing, however, is substantially the same as with the device shown in Figs. 1, 2, and 3.

Reference is hereby made to application Serial No. 377,115, filed by me June 3, 1907, for improvements in automatic weighing machines, in which application are shown and claimed certain features herein shown and described but not claimed.

What I claim is:

1. In a device of the kind described, the combination with a frame and a weighing element, of a weight supported alternately on the frame and on the weighing element, and differentially-traveling supports forming part of the weighing element for shifting said weight.

2. In a device of the kind described, the combination with a frame and a weighing element, of a ball supported alternately on the frame and on the weighing element, and differentially-traveling supports forming part of the weighing element for supporting the ball thereon and for shifting it.

3. In a device of the kind described, the combination with a frame and a weighing element having a scale-beam, a platform pivoted to the scale-beam and provided with a socket and an evener, a bracket on the frame provided with a socket, said two sockets being arranged opposite to each other, said scale-beam having an extension between said sockets, and a ball; said parts being so related that the differential travel of the first-named socket and the extension will permit the ball to roll therefrom to the second-named socket, substantially as described.

4. In a device of the kind described, the combination with a frame and a weighing element having a scale-beam, a platform pivoted to the scale-beam and extending inwardly from the pivot and provided in the extension with a socket, a bracket secured to the frame with a socket opposite the first-named socket, pins secured to the scale-beam between the two sockets, a ball, and an evener for the platform; said parts being so arranged that the ball may be supported alternately on the first-named socket and the pins and on the second-named socket, and so that the differential travel of the first-named socket and the pins will permit the ball by the force of gravity to roll therefrom onto the second-named socket, and so that in another position the ball will be permitted to roll from the second-named socket onto the first-named socket and the pins, substantially as described.

5. In a device of the kind described, the combination with a frame and a weighing element, said frame and weighing element being adapted to support alternately a weight, of said weight, and an intermediate supporting element forming part of the weighing element and so arranged as to be withdrawn from said weight on the operation of the weighing element so as to permit the weight to be shifted, wholly by the force of gravity, from the one support to the other, and thereby relatively increase the relative weight of the load on the weighing element.

6. In a device of the kind described, the combination with a frame, a scale-beam fulcrumed thereon and a weighing container and an adjustable counter-weight supported on the scale-beam, of a platform pivoted to the scale-beam and an evener associated therewith, said platform having a socket located inwardly toward the fulcrum; of a bracket on the frame having a socket located oppositely to the platform socket, pins on the balance-beam extending up between said sockets, and a ball adapted to be supported alternately on the first-named socket and the pins and on the second-named socket, the second-named socket being slanting; said parts being so arranged that when the scale-beam is down the ball will be permitted to roll from the second-named socket onto the first-named socket and the pins and be supported thereon; and when the scale-beam travels upwardly, the relatively slower travel of the pins will permit said ball to roll from its support on said pins and the first-named socket onto the second-named socket; substantially as described.

In testimony whereof I have hereunto signed my name in the presence of witnesses.

CHARLES D. SCOTT.

Witnesses:
  D. H. MARTIN,
  M. V. ARIAL.